United States Patent
Puglisi

[19]

[11] Patent Number: 5,482,582
[45] Date of Patent: Jan. 9, 1996

[54] PROCESS FOR MANUFACTURING A RESIN IMPREGNATED FISHING FLY

[76] Inventor: Enrico Puglisi, 249 - 17 37th Ave., Little Neck, N.Y. 11362

[21] Appl. No.: 142,244

[22] Filed: Oct. 22, 1993

[51] Int. Cl.$^6$ .............................. A01K 85/08; B05D 3/12
[52] U.S. Cl. ........................ 156/74; 427/240; 43/42.25; 43/42.53
[58] Field of Search ................ 43/42.53, 42.25, 43/4; 156/74; 427/240

[56] References Cited

U.S. PATENT DOCUMENTS

| | | | |
|---|---|---|---|
| 1,640,599 | 8/1927 | Conn | 43/42.25 X |
| 2,332,655 | 10/1943 | Miles | 43/42.53 X |
| 2,575,248 | 11/1951 | Clark | 43/42.25 |
| 2,775,055 | 12/1956 | Waugh et al. | 43/42.25 |
| 5,084,997 | 2/1992 | DiPaola | 43/42.25 X |

*Primary Examiner*—Jeff H. Aftergut

[57] ABSTRACT

An apparatus for aiding in the uniform curing of resin impregnated fishing flies and a process for effecting such uniform cure. The method is for uniformly curing a resin of a resin impregnated fishing fly. It comprises impregnating a fishing fly, placing hook point of the impregnated fishing fly into a resilient surface of a wheel, and motor rotating the wheel until the resin is set to touch. In addition, the invention involves an apparatus for the uniform curing of a resin of a resin impregnated fishing fly which comprises a resilient wheel attached to a motor that rotates the wheel at a predeterminable speed, which wheel has means for accepting and releasing the hook point of a fishing fly when the fishing fly is inserted into the wheel or pulled from the wheel. The invention also relates to a rotatable wheel in the form of a disc that is a composite of a foam sublayer and a denser outer layer. The wheel of the apparatus of the invention is a composite structure of a sublayer of a foam that has the resilience of repeatedly receiving and releasing a barbed or barbless hook point of a fishing fly. The outer layer of the wheel is a resilient material also capable of repeatedly receiving and releasing a barbed or barbless hook point of a fishing fly. However, the outer layer is a material that is denser than the inner layer.

5 Claims, 1 Drawing Sheet

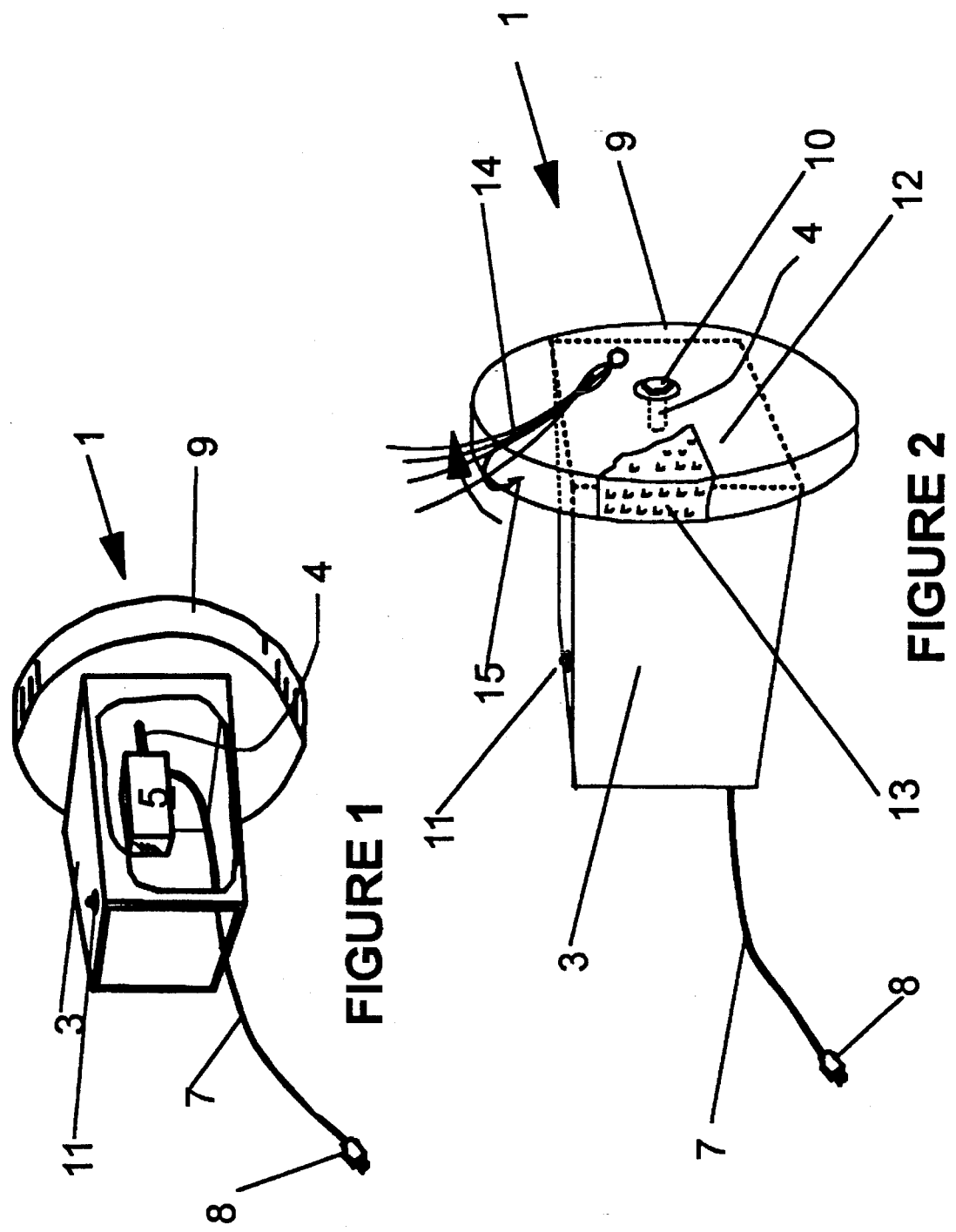

PROCESS FOR MANUFACTURING A RESIN IMPREGNATED FISHING FLY

BRIEF DESCRIPTION OF THE INVENTION

The device of the invention is a motor driven wheel that possesses a resilient surface into which a fishing fly can be affixed. The wheel is designed by its motorized rotation to dry a fishing fly that has been impregnated with a curing (thermosetting) resin so that the cure is uniform throughout the impregnated portion of the fly.

BACKGROUND OF THE INVENTION

In making a fishing fly, it is often desirable to impregnate a portion of the body of the fly around the shaft of the hook with a curable resin such as a room temperature curing epoxy. This is conventionally done by capturing the fly in a rotatable vise, impregnating the fly as desired with the resin and then hand rotating the fly by a handle associated with the vise. The purpose of this rotation is to maintain an uniform distribution of the resin about the fly during the curing of the resin. This curing procedure is tiring and time consuming for the fisherman. Frequently, the rotation imparted to the fly is spotty because the fisherman loses interest in the procedure which can last from 5 to 45 minutes for the resin to set. Final cure is done by removing the fly from the vise and setting it aside. These cure schedules are dictated by the curing catalyst/accelerators used in the epoxy resin. A short-time cure resin is generally used in the initial development of the fly. It is then followed by application of a longer-time cure resin. In general, the short-time cure resin application is used in developing the initial fly structure. The initial setting of the resin may take as little as 5 minutes and then the fly is set aside for about 24 hours. The next application of resin is a longer-time cured epoxy resin. A typical resin of this type has a time cure of about 30–45 minutes. Such a cure merely sets the resin, and leaving the resin overnight for about a 24 hour period will result, in the typical case, in a complete cure. Actually, epoxy resins continue curing for days afterwards, but it is conventional to assume that the 24 hour setting of the resin results in a full cure.

As noted above, the procedure of impregnating the fly is tiresome and hand rotation is spottily applied. When the rotation of the fly with the curing resin is nonuniformly applied, the resin has a tendency to sag. As a result, part of the fly gets more resin and another part gets less resin. Such a fly loses the appearance that the fisherman seeks in the fly, makes the fly less effective as a lure for the fish, and adversely affects the casting and retrieving qualities of the fly.

It is an object of this invention to minimize the nonuniform curing of the resin on the fly.

It is another object of this invention to reduce sagging of the resin on the fly during the curing of the resin.

It is another object of this invention to hasten the cure of the resin applied to the fly without sagging.

It is a further object of this invention to automate the cure cycle of the resin applied to the fly.

It is another object of the invention to make resin impregnated fishing flies that have a uniform distribution of the impregnated resin about the zone of impregnation of the fly.

Another object of this invention is the provision of a revolving wheel that will receive the hook point of the curable resin impregnated fishing fly, and will rotate the fly during the curing of the resin.

A further objective of the invention is a revolving wheel that is capable of receiving a plurality of such flies and which can be so used repeatedly.

THE INVENTION

The invention relates to an apparatus for aiding in the uniform curing of resin impregnated fishing flies and to a process for effecting such uniform cure. The invention involves a method for uniformly curing a resin of a resin impregnated fishing fly which comprises impregnating a fishing fly, placing hook point of the impregnated fishing fly into a resilient surface of a wheel, and motor rotating the wheel until the resin is set to touch. In addition, the invention involves an apparatus for the uniform curing of a resin of a resin impregnated fishing fly which comprises a resilient wheel attached to a motor that rotates the wheel at a predeterminable speed, which wheel has means for accepting and releasing the hook point of a fishing fly when the fishing fly is inserted into the wheel or pulled from the wheel.

The wheel of the apparatus of the invention is a composite structure of a sublayer of a foam that has the resilience of repeatedly receiving and releasing a barbed or barbless hook point of a fishing fly. The outer layer of the wheel is a resilient material also capable of repeatedly receiving and releasing a barbed or barbless hook point of a fishing fly. However, the outer layer is a material that is denser than the inner layer.

The invention also relates to a rotatable wheel in the form of a disc that is a composite of a foam sublayer and a denser outer layer. Desirable sublayers are Styrofoam or polyurethane foam, and desirable outer layers are cork and needle punched nonwoven fabrics.

BRIEF DESCRIPTION OF THE DRAWINGS

FIG. 1 is a perspective and schematic view with cutaway sections of the apparatus of the invention taken from the back of the apparatus.

FIG. 2 is a perspective and schematic view with cutaway sections of the apparatus of the invention taken from the front of the apparatus.

DETAILED DESCRIPTION OF THE INVENTION

FIGS. 1 and 2 illustrate the motorized wheel apparatus I containing wheel 9 and electric motor 5 within housing 3 (cutaway). Motor 5 may be a fixed or variable speed motor. The housing may be made of plastic or wood. The back wall of the housing may contain ventilation holes for cooling motor 5. A convenient motor is a 115 volt, 70 amp rotating motor operating at about 4 revolutions per minute (rpm). It is attached to wheel 9 by shaft 4 that contains a screw end. Wheel 9, made of a Styrofoam (expanded cellular polystyrene) sublayer 13 (cutaway of outer layer 12) covered by cork outer layer 12, is affixed through shaft 4 to motor 5 and held in place by plastic washer and plastic nut combination 10. The Styrofoam sublayer 13 is typically about 2 inches thick and has a diameter of 9 inches. The cork 12 top layer is about one quarter inch in thickness and is glued to Styrofoam 13 sublayer. A conventional hot melt adhesive is effective in gluing the two layers together.

The sublayer may be made of other foam materials, such as polyurethane foam, especially on that is closed cell and resilient. Cellulosic foams may also be used for the sublayer. Combined and adhesively bonded to the sublayer is the outer layer, which in the preferred case, is make of cork. Various qualities of cork are suitable in the practice of the invention though the highest quality cork gives the best results. Other materials than cork can be used for the outer layer. For example, the outer layer may be made of a needle punched nonwoven fabric. Such a fabric has the capability of receiving the hook points without being cut or shredded. Preferably, the fibers in the fabric are made of staple or continuous filament nylon, polypropylene, polyester, and the like.

Wheel 9 has a disc shape and is made from a commercially available disc of Styrofoam or other foams. The outer layer is applied by putting a conventional hot melt adhesive such as ethylene-vinyl acetate or other types of hot melts that can be purchased in a craft store on the back surface of the outer layer that is cut and sized to the disc shape before or after application. A narrow strip of the outer layer is glued to the edge of the disc by the same procedure. If the disc is to be reversible then the backside of the disc is covered with the outer layer. Other forms of adhesives than hot melts are suitable, such as an acrylic latex based adhesives, solvent based adhesives, thermosetting resin adhesives (such as an epoxy resin adhesive), and the like.

Electric motor 5 is provided with cord 7 and plug 8 for convenient connection to any outlet. The uncured resin impregnated fishing fly 14 is afffixed to wheel 9 by pushing the hook point 15 of the fly into the outer layer 12 and into inner layer 13. The motor is then turned on by pushing down switch 11 for motor 5. In this depiction, wheel 9 rotates clockwise causing the fly to revolve in the same direction. During the revolution, the fly is turned in all directions in a uniform manner and the same uniform centrifugal force is imposed on the resin causing it to maintain the uniform dimensions designed for the resin impregnated fly during the resin setting up where the dimensions of the resin portion of the impregnated fly is fixed. Later curing of the resin does not alter the shape of the set resin except to the extent the resin undergoes shrinkage, which is a chemical realignment of the resin that does not impact on the sagging phenomenon. In this manner, the resin does not sag during the setting up phase of the resin.

The invention is most beneficially used with thermosetting resin, such as epoxy and phenolic resin. However, the apparatus and process could be applied beneficially to the curing of thermoplastic resins such acrylic resin, especially those that are applied out of a latex.

I claim:

1. A method for manufacturing a resin impregnated fishing fly having a uniform resin coating thereon which comprises resin impregnating a fishing fly having a hook point, placing the hook point of the resin impregnated fishing fly into a resilient surface of a wheel associated with a motor for rotation of the wheel, and operating said motor to rotate the wheel while the hook point of the fishing fly is disposed in the resilient surface of the wheel until the resin is set to touch thereby providing the resin impregnated fishing fly with a uniform resin coating.

2. The method of claim 1 wherein the wheel is made of a sublayer of a foam and an outer layer of a denser material.

3. The method of claim 2 wherein the sublayer is expanded cellular polystyrene and the outer layer is cork.

4. The method of claim 2 wherein the outer layer is a nonwoven fabric.

5. The method of claim 2 wherein the outer layer is adhesively bonded to the sublayer.

* * * * *